Patented Apr. 1, 1941

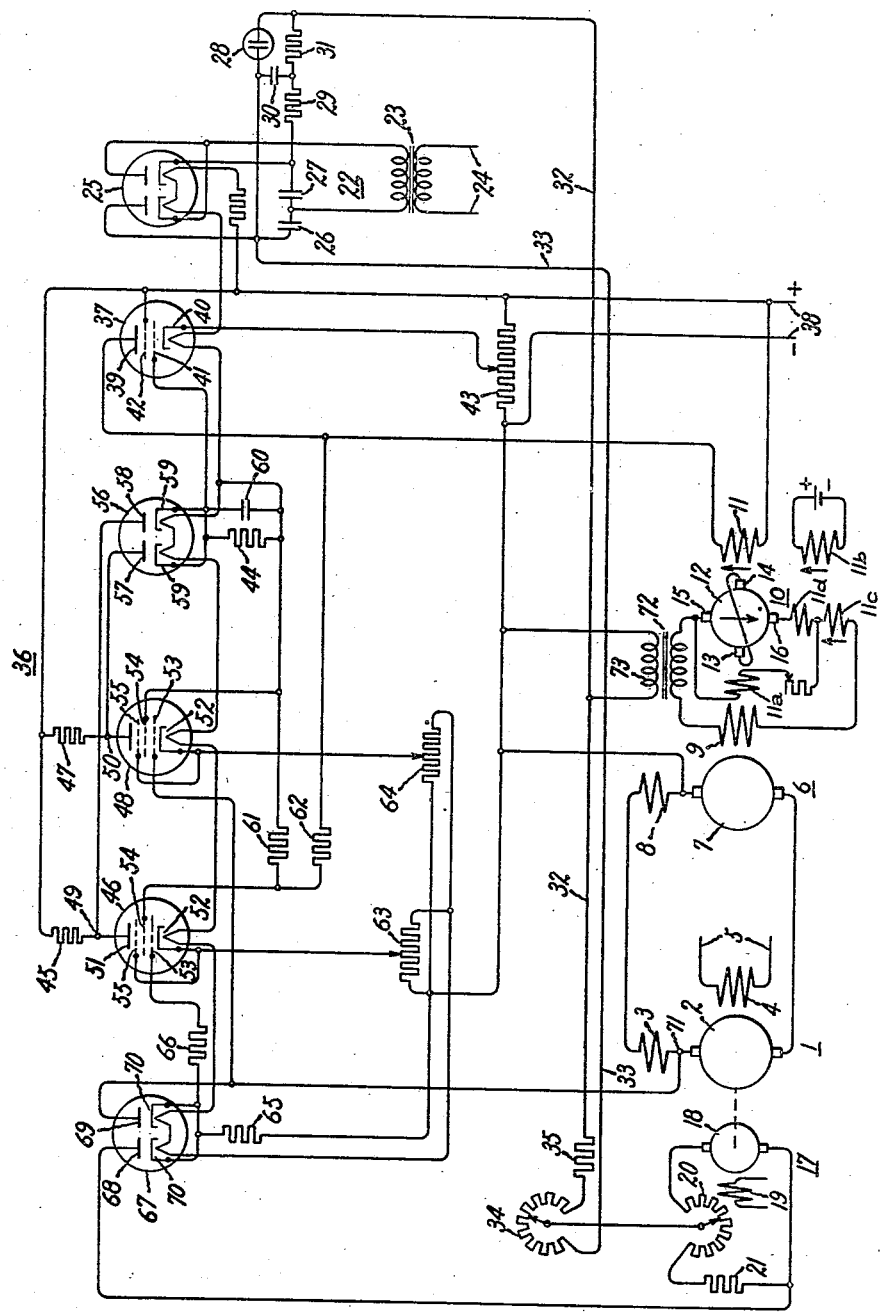

2,237,015

UNITED STATES PATENT OFFICE 2,237,015

ELECTRIC CONTROL SYSTEM

Jerry L. Stratton, Schenectady, N. Y., assignor to General Electric Company, a corporation of New York Application June 24, 1939, Serial No. 280,924

16 Claims. (Cl. 172—239)

My invention relates to electric control systems, such as regulating systems for dynamo-electric machines, and more particularly relates to speed regulators for dynamo-electric machines.

I have found that it is frequently important in the control of dynamo-electric machines to regulate one operating condition of the machines, such as the speed, to maintain the speed within a predetermined range of values so long as the current supplied to the machine does not exceed a predetermined maximum value or decrease below a predetermined minimum value. When such maximum and minimum values are obtained, it is of importance to maintain the current at the limit values and to permit the speed to vary. In accordance with the teachings of my invention described hereinafter, I provide a new and improved electric control system for dynamo-electric machines whereby the speed of the machines is maintained substantially constant so long as the current transmitted to the machine remains within a predetermined range of values.

It is an object of my invention to provide a new and improved electric control system.

It is another object of my invention to provide a new and improved electric control system for dynamo-electric machines.

It is a further object of my invention to provide a new and improved electric valve regulating system for dynamo-electric machines.

It is a still further object of my invention to provide a new and improved electric valve speed regulating system for dynamo-electric machines, whereby the speed is maintained within predetermined ranges of values and whereby the maximum and minimum energizations of the machine are limited.

Briefly described, in the illustrated embodiment of my invention I provide an electric valve system for controlling the speed of a dynamo-electric machine to maintain the speed within a predetermined range of values, and which limits the maximum and minimum energizations of the machine.

For a better understanding of my invention, reference may be had to the following description taken in connection with the accompanying drawing, and its scope will be pointed out in the appended claims. The single figure of the drawing diagrammatically illustrates an embodiment of my invention as applied to a direct current motor for regulating the speed thereof and for controlling or limiting the maximum and minimum current values transmitted to the armature winding thereof.

Referring now to the single figure of the drawing, my invention is there represented as applied to a system for regulating an operating condition, such as the speed, of a dynamo-electric machine. The machine to be controlled may be a direct current motor 1 having an armature winding 2, a series field winding 3 and a shunt field winding 4. The shunt field winding 4 may be energized, if desired, from a separate source of direct current 5. The operating condition, such as the speed, of the motor 1 is controlled by suitable translating apparatus capable of transmitting a variable voltage to the armature 2 of motor 1. This translating apparatus may comprise a direct current generator 6 driven by suitable means (not shown) having an armature winding 7, a series field winding 8 and a second field winding, such as a shunt field winding 9. The motor 1 and the generator 6 are arranged in the conventional Ward-Leonard manner so that the speed of the motor 1 is controlled by variations in the energization of the field winding 9.

I provide an auxiliary dynamo-electric machine 10 which is of the armature excited type for variably energizing the field winding 9 of generator 6. The armature excited machine 10 may be termed an exciter which amplifies the variations in current transmitted to its control field winding 11. The machine 10 may be provided with an armature winding 12 and is provided with two sets of brushes; one set of brushes, including brushes 13 and 14, are short-circuited or connected through a conductor of low resistance and provide a path for the short circuit current which produces one component of the exciting flux of the machine. The other set of brushes, including brushes 15 and 16, produce a voltage which varies as the energization of the control field winding 11. The voltage appearing across the brushes 15 and 16 is an amplified voltage relative to the voltage or current of the control field winding 11. Field winding 9 of generator 6 is energized from the armature or the output of the machine 10.

The auxiliary dynamo-electric machine 10 may also be provided with additional windings. For example the machine may have a shunt winding 11a which establishes a magnetomotive force to assist that provided by the cross magnetomotive force produced by the armature current flowing through the connection between brushes 13 and 14. In addition, the machine 10 may have a compensating winding 11c, the magnetomotive force of which opposes and substantially neutralizes the normal armature reaction. Machine 10 may also be provided with a commutating winding 11d. In order to assure the proper build-up of the voltage of machine 10, auxiliary bias or exciting winding 11b may be connected to produce a magnetomotive force which assists that provided by the compensating winding 11c and the control field winding 11. Certain features of the dynamo-electric machine 10 are disclosed and claimed in a copending application Serial No. 281,008 of E. F. W. Alexanderson and M. A. Edwards, filed concurrently herewith and which is assigned to the assignee of the present application.

As an agency for producing a voltage, such as a unidirectional voltage, which varies in accordance with the speed of the motor 1, I provide a suitable arrangement, such as a tachometer or pilot generator 17, comprising an armature winding 18 and a field winding 19. The output of the pilot generator 17 may be connected across a voltage divider 20, and a resistance 21 may be connected in series relation with the voltage divider. In order to provide a source of reference voltage against which the output voltage of the pilot generator 17 acts, I employ a suitable arrangement, such as a rectifier circuit 22, which may comprise a transformer 23 energized from a suitable source of alternating current 24 and may include a voltage-doubling type of rectifier comprising a double-anode electric valve 25, capacitances 26 and 27 and a suitable constant potential device such as a glow discharge device 28. The voltage appearing across the terminals of the glow discharge device 28 remains substantially constant and serves as a reference potential against which the output voltage of the pilot generator 17 acts. A resistance 29 and a capacitance 30 may be connected across the output terminals of the rectifier circuit 22, and an impedance, such as a resistance 31, may be connected between one terminal of the capacitance 30 and the glow discharge valve 28. The potential difference between the conductors 32 and 33 remains substantially constant, and a predetermined component of the constant reference voltage furnished by the glow discharge device 28 is obtained through a voltage divider 34 which is connected to conductors 32 and 33 through a resistance 35. By the adjustment of the voltage dividers 20 and 34, the net voltage or the difference voltage between the output voltage of the tachometer pilot generator 17 and the glow discharge device 28 may be adjusted.

To variably energize the control field winding 11 of the armature excited machine 10 in response to the speed variations of the motor 1, and to control the energization of control field winding 11 to maintain the speed of motor 1 substantially constant, I provide an electronic regulator 36. The electronic regulator 36 also limits the maximum and minimum current values transmitted to the armature winding 2 of the direct current motor 1. That is, the electronic regulator 36 maintains the speed of the direct current motor 1 within a predetermined range of values or at a substantially constant value so long as the armature current transmitted to the armature 2 does not exceed or become less than the respective predetermined values. If the armature current tends to exceed this range of values, the speed is permitted to vary and the maximum or minimum value of armature current is maintained. Certain features of the control or regulating circuit 36 are disclosed and claimed in my copending divisional application Serial No. 351,970, filed August 9, 1940, and which is assigned to the assignee of the present application.

Referring more particularly to the electronic regulator 36, I provide an electric valve means 37 which variably energizes the control field winding 11 by transmitting variable amounts of unidirectional current thereto from a suitable source of current, such as a direct current circuit 38. The electric valve means 37 may be of the high vacuum type comprising an anode 39, a cathode 40, a control grid 41 and a screen grid 42. The screen grid 42 may be connected to a source of voltage positive with respect to the cathode 40. The voltage applied between the screen grid 42 and the cathode 40 and, of course, the voltage applied between the anode and the cathode may be controlled or adjusted by means of a suitable voltage divider 43 connected across the source 38.

The conductivity of the electric valve means 37 and hence the current transmitted to the control field winding 11 are determined primarily by the potential impressed on the control grid 41. This control potential is obtained by means of an impedance element, such as a resistance 44. Variable amounts of unidirectional current are transmitted through the resistance 44 to control the potential impressed on the control grid 41. To provide a control system in which the conductivity of the electric valve means 37 is controlled selectively in response to two different predetermined controlling influences, I provide a pair of electric circuits energized from the direct current circuit 38. One of these electric circuits includes a serially connected impedance element, such as a resistance 45, and an electronic discharge device 46; and the other circuit includes a serially connected impedance element, such as a resistance 47, and an electronic discharge device 48. Suitable points or connections of the two circuits are employed as points of reference potential. For example, I may employ common junctures 49 and 50 of the resistances 45, 47 and electronic discharge devices 46, 48, respectively, as reference points. Electronic discharge devices 46 and 48 are preferably of the high vacuum type, each comprising an anode 51, a cathode 52, a control grid 53, a screen grid 54, and a suppressor grid 55 which may be connected to the associated cathode 52.

I employ an electric valve means 56 for selectively controlling the conductivity of the electric valve means 37 from that circuit of said pair of circuits which produces the predominating voltage in response to the respective related controlling influence. That is, the electric valve means 56 is provided with a pair of electric discharge paths associated with anodes 57 and 58 and the electrically common cathodes 59 thereof to energize the resistance 44 from that circuit of the pair of circuits which produces the predominating control potential. The feature of using a double-anode or a double-cathode electric valve as a means for effecting selective control from the circuit providing the predominating control voltage is disclosed and claimed in U. S. Patent No. 2,019,352, granted October 29, 1935, upon an application of O. W. Livingston, and which is assigned to the assignee of the present application. A capacitance 60 is connected across the resistance 44 to serve as a means for absorbing extraneous voltage variations. Screen grid 54 of electronic discharge device 46 is connected to the lower terminal of resistance 44 through a resistance 61, and is also connected to the anode 39 of electric valve 37 through a resistance 62. These connections afford a feed-back arrangement between the electric valve means 37 and the electronic discharge devices 46 and 48. That is, there is a feed-back arrangement between electric valve 37 and discharge device 46 through resistance 62 and the screen grid 54, and there is also a feed-back arrangement between the electric valve 37 and the electronic discharge device 48. These feed-back circuits increase the sensitivity of the electronic regulator 36. Suitable potential adjusting devices, such as voltage dividers 63 and 64, may be associated with the electronic discharge devices 46 and 48, respectively, to adjust the potentials of the respective cathodes and to control the currents conducted through the associated circuits. The voltage divider 63 sets or establishes the maximum current limit of the regulator 36, and the voltage divider 64 establishes the minimum current limit for the regulator 36.

The electronic regulator 36 variably energizes the control field winding 11 of the machine 10 to maintain the speed of the motor 1 at a substantially constant value. This operation is effected by controlling the potential of the control grid 53 of the electronic discharge device 46. The variation in the potential of the control grid 53 may be obtained by means of a suitable impedance element, such as a resistance 65, which is variably energized in accordance with the difference between the component of the output voltage of the pilot generator 17 and a component of voltage derived from the constant voltage device 28. The unidirectional current transmitted through the resistance 65 varies in accordance with the speed of the motor 1 and controls the potential impressed on the control grid 53. A suitable current limiting resistance 66 may be connected in series relation with the control grid 53.

In order that the electronic regulator 36 maintain the speed of the motor 1 substantially constant within a predetermined range of values and in order that the regulator be controlled to limit the maximum and minimum energizations of the armature winding 2 of motor 1, I provide a suitable selective means, such as an electric valve means 67, which comprises a pair of electric discharge paths associated with anodes 68 and 69 and electrically common cathodes 70. Of course, it is to be understood that the discharge current will be carried by the discharge path on which there is impressed the predominating voltage. Anode 68 is connected to one terminal of the pilot generator 17, and anode 69 is connected to be responsive to the energization of the machine 1. It will be noted that the anode 69 is connected to the common juncture 71 of the series field winding 3 and the armature winding 2 of motor 1. Furthermore, the anode 69 is connected to the control grid 53 of the electronic discharge device 48. The electric valve 67 serves to control the relative amounts of current conducted by electronic discharge devices 46 and 48, that is, serves to control the relative conductivities of these discharge devices selectively in response to that controlling influence which provides the predominating control potential.

I provide an anti-hunting means connected between the output or armature circuit of the armature excited machine 10 and the electronic regulator 36. This anti-hunting means may comprise a transformer 72 having a secondary winding 73, one terminal of which is connected to conductor 32 and the other terminal of which is connected to the cathode 52 of the electronic discharge device 46 through voltage divider 63. The transformer 72 is connected to modify the regulating action of the electronic discharge device 46 to prevent over-shooting or under-shooting of the speed of the motor 1.

The operation of the embodiment of my invention shown in the single figure of the accompanying drawing will be explained by considering the system when it is operating to control the speed of the direct current motor 1. Of course, it will be understood by those skilled in the art that the speed of the motor 1 varies directly as the voltage applied to the armature winding 2, assuming that the energization of the field winding 4 remains substantially constant. The variable energization of the control field winding 11 controls the excitation of the generator 6 and hence controls the terminal voltage of that generator.

During normal operation, in which the energization of the armature winding 2 does not exceed the maximum or minimum limit, the control field winding 11 is variably energized to maintain the speed of the motor 1 substantially constant. The electric valve means 37 transmits variable amounts of current from the source 38 to the control field winding 11, and the conductivity of the electric valve means 37 is determined by the potential appearing across the terminals of resistance 44. So long as the aforesaid current limits are not exceeded, the variations in speed of the motor 1 produce corresponding variations in the output voltage of the pilot generator 17 to cause variations in the amount of unidirectional current transmitted through resistance 65. Of course, during normal operation the discharge current is conducted between anode 68 and cathode 70 and the variable control potential is impressed across control grid 53 and cathode 52 of discharge device 46.

As the speed varies, the conductivity of the electronic discharge device 46 also varies and the potential of connection 49 is raised or lowered to control the amount of current transmitted through resistance 44 which, in turn, controls the conductivity of the electric valve means 37. For example, if the speed of the motor 1 tends to increase above the desired value, the generated voltage produced by the pilot generator 17 also increases, thereby causing an increase of current transmitted through resistance 65. An increase in current transmitted through the resistance 65 raises the potential impressed on control grid 53 of electronic discharge device 46 and, since the current through the resistance 45 is increased, the potential of the juncture 49 will be lowered. Consequently, the current transmitted through resistance 44 will be decreased and the conductivity of the electric valve means 37 will be correspondingly decreased. In this manner, the amount of current transmitted to the control field winding 11 is decreased, effecting a reduction in the current transmitted to field winding 9 of generator 6. As a result, the voltage applied to the armature winding 2 of motor 1 is decreased and the speed will be restored to the desired value. Conversely, as the speed of the motor 1 tends to decrease, it will be understood that the energization of the control field winding 11 will be increased by the electronic regulator 36 to raise the speed of the motor 1 to the desired value.

During the above described normal range of operation, the current transmitted to the resistance 44 is, of course, conducted through a path including anode 58 of the electric valve means 56. The electronic discharge device 48 is maintained conductive during the normal range of operation to such an extent that the potential of the common juncture 50 and that of the anode 57 of electric valve means 56 are lower or negative relative to the potential of anode 58.

The electronic regulator 36 also operates to limit the maximum energization of the armature winding of motor 1 in the following manner: If the current transmitted to the armature winding 2 of motor 1 tends to exceed a predetermined value, the potential of the common juncture 71 of the armature 2 and field winding 3 rises, causing the control to be transferred from anode 68 to anode 69 of the electric valve means 67, in which case the control of the pilot generator 17 is rendered ineffective. The potential of the control grid 53 of electronic discharge device 46 is limited so that the maximum current transmitted to the control field winding 11 remains substantially constant, thereby limiting the energization of the armature winding 2 of motor 1. The operation of the regulator 36 which limits the maximum energization of the armature winding of motor 2 may be explained in the following manner. When the energization reaches a predetermined maximum value, causing anode 69 of the electric valve 67 to conduct, a circulating control current flows through a circuit including anode 69, cathode 70, resistance 65, armature winding 7 of generator 6 and armature 2 of motor 1. It will be noted that the left-hand terminal of voltage divider 63 is connected to the negative terminal of circuit 38. If the current tends to increase above this maximum value, the circulating current temporarily increases and conductivity of the electronic discharge device 46 will be temporarily increased, effecting a reduction in the potential of anode 58 of electric valve 56 and effecting a corresponding decrease in the conductivity of the electric valve means 37. Consequently, the current transmitted to motor 1 will be decreased to the desired value. The potential applied to grid 53 of discharge device 46 under these conditions is the difference between the voltage drop across field windings 3 and 8 and the potential difference between the cathode 52 and the negative terminal of circuit 38. Therefore, the maximum potential variation of the grid 53 with respect to the cathode 52 is limited to set a maximum limit to the current supplied to armature winding 2. The setting of the voltage divider 63 establishes the value of the maximum limit.

The electronic regulator 36 also operates to limit the minimum energization of the armature winding 2, thereby preventing a regenerative action between the motor 1 and the generator 6. If the armature current transmitted to motor 1 decreases below a predetermined value, it will be noted that the potential of the control grid 53 of the electronic discharge device 46 is lowered, effecting a substantial decrease in conductivity of the electronic discharge device 48. As a result, the potential of the juncture 50 will rise, causing the potential of anode 57 of the electric valve 56 to become more positive than that of the anode 58 and effecting a transfer in control to electronic discharge device 48 from the electronic discharge device 46. In this manner, a minimum conductivity in the electric valve means 37 is assured and consequently a predetermined minimum current is assured for the energization of the control field winding 11. The energization of the armature winding of the motor 1, therefore, is maintained at or above a predetermined minimum value. The value of the minimum current transmitted to the armature winding 2 is established by the setting of the voltage divider 64 since it determines the potential of the cathode 52 of discharge device 48.

The anti-hunting means, including the transformer 72, serves to prevent over-shooting of the regulatory action of the electronic regulator 36. The operation and the effect of the anti-hunting means may be explained in the following manner. If it be assumed that the electronic regulator dictates an increase in the energization of the control field winding 11, the transformer 72 is connected to impress a transient positive voltage on the cathode 52 of the electronic discharge device 46, thereby tending to decrease the conductivity of this discharge device and effecting a stabilizing action which tends to prevent over-energization of the control field winding 11. Of course, if the electronic regulator 36 dictates a decrease in energization of the control field winding 11, the transformer 72 impresses a transient negative voltage on the cathode 52 of electronic discharge device 46, thereby tending to prevent an undershooting of the energization of the control field winding 11. That is, the anti-hunting means acts as a stabilizing means to effect a more precise control of the speed of the motor 1 under transient load conditions.

The feed-back connection between the anode-cathode circuit of the electric valve means 37 and the screen grid 54 of the electronic discharge device 46 enables the regulator 36 to maintain accurately the speed of the motor 2, inasmuch as the circuit increases the sensitivity of the regulatory action. This effect, which is a positive feed-back, may be appreciated by considering the regulator 36 under these conditions when the electronic discharge device 46 is controlled by an increase of potential on the control grids 53, tending to increase the conductivity of the discharge device. Upon such increase in the current conducted by the discharge device 46, the voltage impressed on the control member 41 of electric valve 37 will be decreased effecting a temporary rise in potential of the anode 39. This rise in potential of the anode raises the potential of screen grid 54 and accordingly increases the sensitivity of the regulator.

The armature excited machine 10 operates as an electromagnetic amplifier; that is, small variations in the current transmitted to the control field winding 11 produce a highly amplified variation in the output of machine 10. The control field winding 11 produces a magnetomotive force having a component displaced 90 electrical degrees relative to the cross magnetomotive force produced by the short-circuit current which flows in the armature winding 12 due to the connection between brushes 13 and 14. The object of the control field winding 11 is to permit the output voltage appearing across brushes 15 and 16 to be varied without introducing additional controlling means in the armature circuit. The control field 11 effects control of the current output of the armature winding 12; and, as stated above, there is obtained a substantial amplifying effect between the energization of the control field winding 11 and the output circuit of the machine 10. The value of the output current of machine 10, for a given input voltage impressed across the control field winding 11, may be varied by varying the control field current. Of course, it is to be understood that the armature excited machine 10 is driven mechanically. In the embodiment of the invention shown, the armature of the machine 10 may be connected mechanically to the generator 6 or to the means which drives the generator 6. The machine 10 responds very rapidly to changes in field energization to produce changes in output current. Of course, the input current or changes in input current will be amplified.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a direct current motor having an armature winding, means for energizing said armature winding and comprising a generator having a field winding and an auxiliary dynamo-electric machine of the armature excited type having a control field winding, a source of current, an electric valve means connected between said source and said control field winding for transmitting variable amounts of current thereto, said electric valve means having a control member for controlling the current transmitted thereby, a pilot generator mechanically coupled to said motor for producing a unidirectional voltage which varies in accordance with the speed of said motor, means connected between said pilot generator and said control member for controlling the voltage impressed thereon and comprising an impedance element, an electronic discharge device responsive to the voltage of said pilot generator for controlling the current transmitted through said impedance element, a second electronic discharge device for limiting the minimum conductivity of said electric valve means and a pair of unidirectional conducting paths connected between said first mentioned and said second mentioned electronic discharge devices for effecting selective control of said electric valve means from said first mentioned or said second mentioned discharge device, and means connected between said pilot generator and said last mentioned means and comprising a second pair of unidirectional conducting paths for controlling the relative conductivities of said first mentioned and said second mentioned electronic discharge devices.

2. In combination, a dynamo-electric machine having a winding, means for variably energizing said winding to control the speed of said machine, control means for maintaining the speed within a predetermined range of values, and means for limiting the maximum and minimum values of current supplied to said winding.

3. In combination, a dynamo-electric machine having a control winding, a source of current, electric valve means for controlling the amount of current transmitted to said control winding from said source to control the speed of said machine, control means for maintaining the speed within a predetermined range of values, and means for limiting the maximum and minimum values of current supplied to said control winding.

4. In combination, a direct current motor having an armature winding, a direct current generator for energizing said motor and having a field winding, a source of current, means for variably energizing said field winding and comprising an armature excited dynamo-electric machine having a control field winding and electric valve means for transmitting variable amounts of current to said field winding from said source, means for controlling said electric valve means to maintain the speed of said motor within a predetermined range of values, and means responsive to the armature current of said motor for limiting the maximum and minimum values of current supplied to said motor by said generator.

5. In combination, a dynamo-electric machine having a control winding, means for controlling the energization of said control winding and comprising an armature excited machine including a control field winding, electric valve means for controlling the energization of said field winding, and means responsive to a predetermined condition of said first mentioned machine for controlling the conductivity of said electric valve means.

6. In combination, a dynamo-electric machine having a control winding, means for controlling the energization of said control winding and comprising an armature excited machine including a control field winding, electric valve means for controlling the energization of said field winding, and electronic regulating means responsive to a predetermined condition of said first mentioned machine for controlling the conductivity of said electric valve means.

7. In combination, a dynamo-electric machine having a control winding, means for controlling the energization of said control winding and comprising an armature excited machine including a control field winding, a source of current, electric valve means having a control member for variably energizing said control field winding, a pilot generator for producing a voltage which varies in accordance with a predetermined operating condition of said first mentioned machine for impressing a control voltage on said control member, and means for modifying the action of said electric valve means to limit the maximum energization of said field winding.

8. In combination, a dynamo-electric machine having a control winding, means for controlling the energization of said control winding and comprising an armature excited machine including a control field winding, a source of current, electric valve means having a control member for variably energizing said field winding, a pilot generator for producing a voltage which varies in accordance with a predetermined operating condition of said first mentioned machine for impressing a control voltage on said control member, and means for modifying the effect of said pilot generator to limit the maximum energization of said first mentioned control winding.

9. In combination, a direct current motor having an armature winding, a direct current generator for energizing said motor and having a field winding, a source of current means for variably energizing said field winding and comprising an armature excited dynamo-electric machine having a control field winding and electric valve means for transmitting variable amounts of current to said field winding from said source, means for controlling said electric valve means to maintain the speed of said motor within a predetermined range of values, and means responsive to the armature current of said motor for limiting the minimum value of current in order to prevent regenerative action between said motor and said generator.

10. In combination, a direct current motor having an armature winding, a source of current, means comprising electric valve means for variably energizing said armature winding to control the speed of said motor, means for controlling said electric valve means to maintain the speed within a predetermined range of values, and means responsive to the current of said armature winding for limiting the maximum and minimum values of current supplied thereto.

11. In combination, a direct current motor having an armature winding, a direct current generator for energizing said motor and having a field winding, a source of current, means for variably energizing said field winding and comprising an armature excited dynamo-electric machine having a control field winding and electric valve means for transmitting variable amounts of current to said field winding from said source, means for controlling said electric valve means to maintain the speed of said motor within a predetermined range of values, and means responsive to the armature current of said motor for limiting the maximum value of current supplied to said motor by said generator.

12. In combination, a direct current motor having an armature winding, means for energizing said armature winding and comprising a generator having a field winding and an auxiliary dynamo-electric machine of the armature excited type having a control field winding, a source of current, an electric valve means connected between said source and said control field winding for transmitting variable amounts of current thereto, a pilot generator mechanically coupled to said motor for producing a unidirectional voltage which varies in accordance with the speed of said motor, and means connected between said pilot generator and said electric valve means to control the conductivity thereof to maintain the speed of said motor within a predetermined range of values and for limiting the maximum armature current of said motor and comprising a pair of unidirectional conducting paths having one set of corresponding terminals at the same potential and having one other terminal responsive to the voltage of said pilot generator and another responsive to the current of said armature winding.

13. In combination, a motor, a generator for controlling said motor and comprising a field winding, an exciter for variably energizing said field winding and having a control field winding, means for producing a voltage which varies in accordance with an operating condition of said motor, an electronic regulator responsive to said voltage for controlling the energization of said control field winding, and anti-hunting means responsive to the rate of change of the energization of said field winding for modifying the action of said regulator.

14. In combination, a motor, a generator for controlling said motor and comprising a field winding, an armature-excited machine having a control field winding for variably energizing said field winding, means for producing a voltage which varies in accordance with an operating condition of said motor, a regulator for controlling the energization of said control field winding and comprising an electronic discharge valve having an anode, a cathode and a control grid, and anti-hunting means responsive to the rate of change of energization of said field winding for impressing a stabilizing voltage across said control grid and said cathode.

15. In combination, a motor having an armature circuit, a generator for controlling an operating condition of said motor and having an armature circuit connected to the armature circuit of said motor and having a field winding, control means for variably energizing said field winding to control the voltage of said generator and comprising an electronic discharge device having a control grid, means responsive to an operating condition of said motor for producing a voltage which varies in response to said operating condition to variably energize said control grid, and a circuit connected between corresponding terminals of the armature circuits of said motor and said generator to limit the voltage impressed on said control grid to effect a limitation of the maximum energization of the armature circuit of said motor.

16. In combination, a motor having an armature circuit, a generator for controlling an operating condition of said motor and having an armature circuit connected to the armature circuit of said motor and having a field winding, means for variably energizing said field winding to control the voltage of said generator and comprising an electronic discharge device having a control grid, control means responsive to an operating condition of said motor for producing a voltage which varies in response to said operating condition, an impedance element, means responsive to said voltage for transmitting variable amounts of unidirectional current through said impedance element for impressing a variable control potential on said control grid and comprising an electric valve means having a pair of electric discharge paths, one of said paths being energized from said control means, and a control circuit connected between corresponding terminals of said armature circuits of said motor and said generator and comprising the other electric discharge path and said impedance element for limiting the maximum value of said control potential impressed on said control grid to effect a limitation of the maximum energization of said armature winding of said motor.

JERRY L. STRATTON.